United States Patent
Matsuzaki et al.

(10) Patent No.: US 10,815,952 B2
(45) Date of Patent: Oct. 27, 2020

(54) VEHICLE CONTROL DEVICE

(71) Applicant: SUBARU CORPORATION, Tokyo (JP)

(72) Inventors: Tetsu Matsuzaki, Tokyo (JP); Masaki Komuro, Tokyo (JP); Masatoshi Kishikawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/439,514

(22) Filed: Jun. 12, 2019

(65) Prior Publication Data

US 2019/0383256 A1 Dec. 19, 2019

(30) Foreign Application Priority Data

Jun. 14, 2018 (JP) .................................. 2018-113240

(51) Int. Cl.
*F02N 11/08* (2006.01)
*F16H 63/50* (2006.01)
(Continued)

(52) U.S. Cl.
CPC ...... *F02N 11/0811* (2013.01); *F02D 41/0225* (2013.01); *F02D 41/065* (2013.01); *F02N 11/084* (2013.01); *F02N 11/0822* (2013.01); *F02N 11/0844* (2013.01); *F16H 63/50* (2013.01); *F02D 2200/602* (2013.01);
(Continued)

(58) Field of Classification Search
CPC ............. F02N 11/0811; F02N 11/0844; F02N 11/084; F02N 11/0822; F02N 2300/2011; F02N 2200/0802; F02N 2200/0806; F02N 2200/101; F02N 2200/102; F16H 63/50;
(Continued)

(56) References Cited

U.S. PATENT DOCUMENTS 4,286,683 A * 9/1981 Zeigner ................. B60K 15/00
123/179.4
6,308,129 B1 * 10/2001 Uchida .................. F02D 17/04
477/203
(Continued)

FOREIGN PATENT DOCUMENTS

EP 1052399 A2 * 11/2000 .......... F02N 11/0833
JP 2006283735 A * 10/2006
(Continued)

*Primary Examiner* — Hung Q Nguyen
(74) *Attorney, Agent, or Firm* — Troutman Pepper Hamilton Sanders LLP

(57) ABSTRACT

A vehicle control device configured to be capable of executing idle stop control to automatically stop an engine when a predetermined automatic stop condition is satisfied and restart the engine when a predetermined restart condition is satisfied during the automatic stop of the engine, the vehicle control device includes: a start request detector, a shift position detector, and a delay time setting module. A start request detector detects a driver operation indicating a request for starting the engine by a driver. A shift position detector detects a shift position of a shift changer. A delay time setting module sets, on a basis of presence or absence of the driver operation and the shift position, a delay time from when the engine is restarted until when an automatic stop of the engine is permitted.

16 Claims, 6 Drawing Sheets

(51) Int. Cl.
*F02D 41/06* (2006.01)
*F02D 41/02* (2006.01)

(52) U.S. Cl.
CPC .............. *F02N 2200/0802* (2013.01); *F02N 2200/0806* (2013.01); *F02N 2200/101* (2013.01); *F02N 2200/102* (2013.01); *F02N 2300/2011* (2013.01)

(58) Field of Classification Search
CPC ............... F02D 41/065; F02D 41/0225; F02D 2200/602; F02D 41/042
See application file for complete search history.

(56) References Cited

U.S. PATENT DOCUMENTS

| | | | | |
|---|---|---|---|---|
| 6,371,889 | B1* | 4/2002 | Kuroda | B60K 6/485 477/181 |
| 9,828,964 | B1* | 11/2017 | Gabriel | F02N 11/0833 |
| 2002/0029943 | A1* | 3/2002 | Totsuka | B60W 30/18063 188/113 |
| 2011/0172900 | A1* | 7/2011 | Mukaihara | F02D 35/023 701/112 |
| 2011/0172901 | A1* | 7/2011 | Okumoto | F02N 11/0844 701/113 |
| 2012/0209480 | A1* | 8/2012 | Hamane | F16H 61/0031 701/54 |
| 2012/0271508 | A1* | 10/2012 | Kanemoto | F02N 11/101 701/33.6 |
| 2012/0283935 | A1* | 11/2012 | Gregori | B60W 50/087 701/112 |
| 2015/0291174 | A1* | 10/2015 | Nishimura | B60W 30/192 701/53 |
| 2016/0229406 | A1* | 8/2016 | Okabe | B60W 10/107 |

FOREIGN PATENT DOCUMENTS

| | | | |
|---|---|---|---|
| JP | 2010281398 | A * | 12/2010 |
| KR | 101273181 | B1 * | 6/2013 |

* cited by examiner

FIG. 3

| SHIFT POSITION | REASON FOR ENGINE START | PERMISSION FOR IS CONTROL | DELAY TIME |
|---|---|---|---|
| D | DRIVER OPERATION (DRIVER REQUIREMENT) | O | ZERO |
| | OTHER THAN DRIVER OPERATION (A/C REQUIREMENT, ETC.) | O | FIRST DELAY TIME (SHORTER) |
| R | ALL | × | — |
| P or N | DRIVER OPERATION (DRIVER REQUIREMENT) | O | ZERO |
| | OTHER THAN DRIVER OPERATION (A/C REQUIREMENT, ETC.) | O | SECOND DELAY TIME (LONGER) |
| RESTART IN D OR R TO P OR N | DRIVER OPERATION (DRIVER REQUIREMENT) | O | ZERO |
| | OTHER THAN DRIVER OPERATION (A/C REQUIREMENT, ETC.) | O | SECOND DELAY TIME (LONGER) |
| RESTART IN P OR N TO D | DRIVER OPERATION (DRIVER REQUIREMENT) | O | ZERO |
| | OTHER THAN DRIVER OPERATION (A/C REQUIREMENT, ETC.) | O | FIRST DELAY TIME (SHORTER) |
| RESTART IN P OR N TO R | ALL | × | — |

VEHICLE CONTROL DEVICE

CROSS-REFERENCE TO RELATED APPLICATIONS

The present application claims priority from Japanese Patent Application No. 2018-113240 filed on Jun. 14, 2018, the entire contents of which are hereby incorporated by reference.

BACKGROUND

The disclosure relates to a vehicle control device.

Idle stop control to cut fuel consumption amounts or reduce exhaust emissions in vehicles such as automobiles has been put into practical use in the related art. In idle stop control, an engine automatically stops when an automatic stop condition set in advance is satisfied, and the engine is restarted when a pre-set restart condition is satisfied during the automatic stop of the engine.

Examples of an automatic stop condition include a condition indicating a state of an engine whose power has become unnecessary, for instance, when the vehicle stops while the engine is operating, or the like. Examples of a restart condition include a condition that a driver is regarded as having an intention to drive, for instance, releasing of the brake pedal by the driver, depressing of the accelerator pedal by the driver during an automatic stop of the engine, or the like.

In addition, a condition that is not related to an intention of a driver to drive may also be used as a restart condition. For instance, when an engine stops, the air conditioner operating using power of the engine stops accordingly, and thus the function of adjusting the temperature inside the car declines. Thus, even when the driver has no intention to drive the car, the engine is restarted to make the air conditioner operate if there is a gap between the set temperature of the air conditioner and the temperature inside the car.

Here, when the engine is repeatedly restarted and automatically stops in a short period of time, the driver is likely to feel a sense of annoyance. In particular, if the restart of the engine is not due to an intention of the driver, the driver is considered more likely to be annoyed. For the purpose of reducing the sense of annoyance, a technology of keeping an engine operating even when an automatic stop condition is satisfied in a predetermined period (delay time) after the engine is restarted has been introduced.

For instance, Japanese Unexamined Patent Application Publication (JP-A) No. 2016-106441 discloses an air conditioning control device for a vehicle that outputs an engine restart request signal and an idle stop prohibition request signal to an engine ECU when cooling water of the engine hits an insufficient water temperature for heating the cabin or lower. The air conditioning control device for a vehicle disclosed in JP-A No. 2016-106441 prohibits the engine from automatically stopping even if an automatic stop condition is satisfied in a predetermined prohibition time (delay time) after the engine is restarted because a restart condition is satisfied after the automatic stop condition is satisfied and thus the engine automatically stops, in order to prevent repetition of automatic stops and restarts of the engine.

SUMMARY

An aspect of the disclosure provides a vehicle control device capable of executing idle stop control to automatically stop an engine when a predetermined automatic stop condition is satisfied and restart the engine when a predetermined restart condition is satisfied during the automatic stop of the engine. The vehicle control device includes a start request detector configured to detect a driver operation indicating a request for starting the engine by a driver, a shift position detector configured to detect a shift position of a shift changer, and a delay time setting module configured to, on a basis of presence or absence of the driver operation and the shift position, set a delay time from when the engine is restarted until when an automatic stop of the engine is permitted.

An aspect of the disclosure provides a vehicle control device capable of executing idle stop control to automatically stop an engine when a predetermined automatic stop condition is satisfied and restart the engine when a predetermined restart condition is satisfied during the automatic stop of the engine. The vehicle control device includes a start request detector configured to detect a driver operation indicating a request for starting the engine by a driver, and a delay time setting module configured to set a delay time from when the engine is restarted until when an automatic stop of the engine is permitted. The delay time setting module sets the delay time to zero when a restart of the engine is due to the driver operation.

An aspect of the disclosure provides a vehicle control device capable of executing idle stop control to automatically stop an engine when a predetermined automatic stop condition is satisfied and restart the engine when a predetermined restart condition is satisfied during the automatic stop of the engine. The vehicle control device includes circuitry. The circuitry is configured to detect a driver operation indicating a request for starting the engine by a driver. The circuitry is configured to detect a shift position of a shift changer. On a basis of presence or absence of the driver operation and the shift position, the circuitry is configured to set a delay time from when the engine is restarted until when an automatic stop of the engine is permitted.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 3 is a table for describing examples of set delay times;

DETAILED DESCRIPTION

Figure 1:
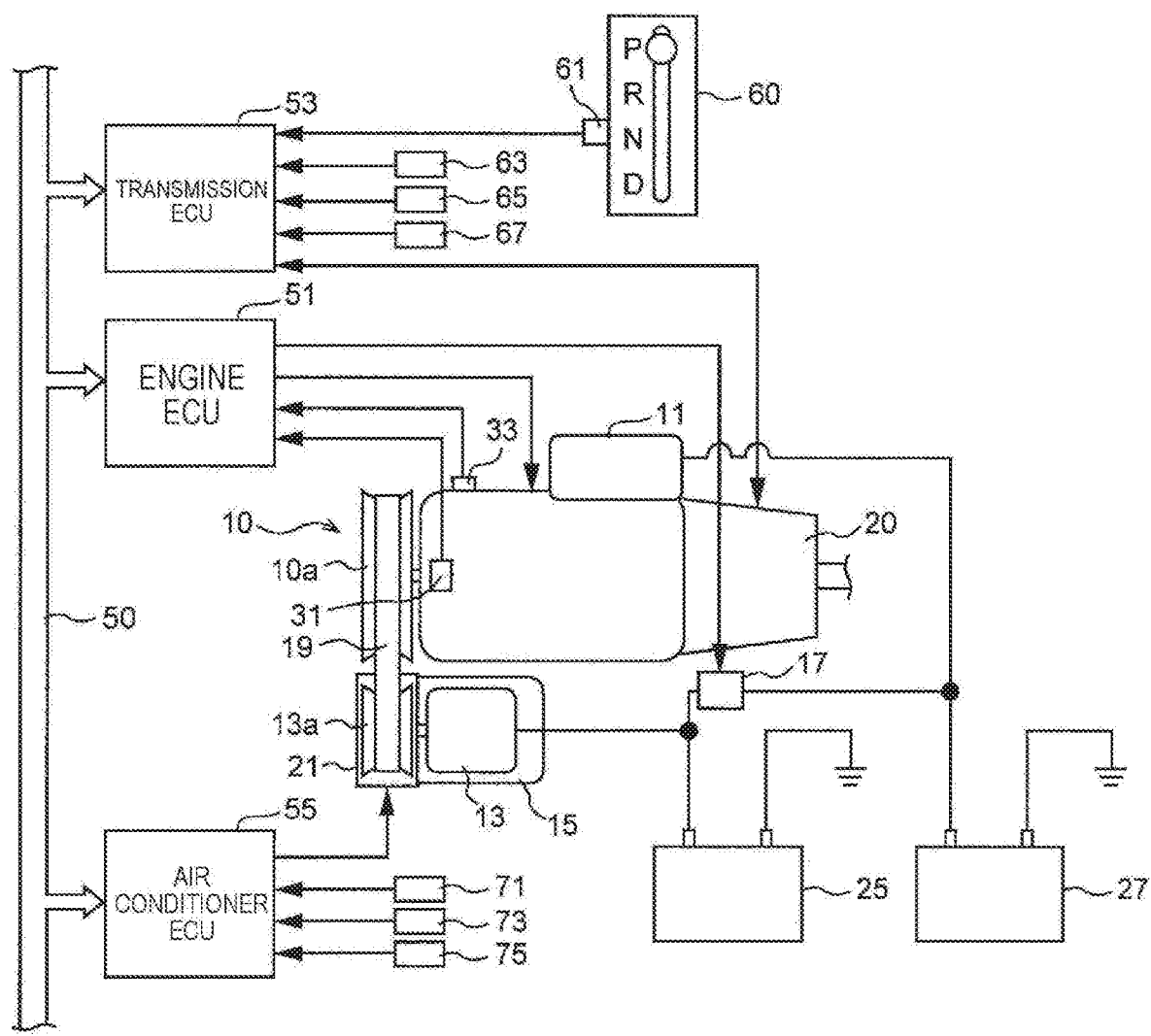
FIG. 1 is a schematic diagram illustrating a basic configuration of a vehicle to which a vehicle control device according to an embodiment of the disclosure can be applied.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. The sense of annoyance of the driver is reduced when a delay time from when an engine is restarted until when an automatic stop of the engine is permitted again is set to be long; however, this is disadvantageous in terms of the fuel consumption amount because the engine stop time becomes short. On the other hand, if the delay time is set to be short, while the engine stop time becomes long, the restarts and automatic stops of the engine are easily repeated in a short period of time, and thus the sense of annoyance of the driver may increase.

According to an aspect of the disclosure, it is desirable to provide a novel and improved vehicle control device that reduces a sense of annoyance of a driver, which may be caused by repetition of restarting and automatic stopping of an engine, and reduce a fuel consumption amount resulting from a secured engine stop time.

<1. Basic Configuration of Vehicle>

An example of a basic configuration of a vehicle to which the vehicle control device according to an embodiment of the disclosure can be applied will be described. FIG. 1 is a schematic diagram illustrating a basic configuration of a vehicle.

First, a drive system of the vehicle will be described. The vehicle is one with an idle stop system. The vehicle includes an engine 10, an automatic transmission 20, a starter 11, a starter generator (generator) 13, and an air conditioner compressor 15. The automatic transmission 20, the starter 11, the starter generator 13, and the compressor 15 are coupled to the engine 10.

In the idle stop system, the engine 10 automatically stops when a predetermined automatic stop condition is satisfied, and then is automatically restarted when a predetermined restart condition is satisfied. The starter 11 is used for starting the engine 10. The starter 11 is coupled to a first battery 27 and cranks the engine 10 with power supplied from the first battery 27 when the engine 10 is started for the first time, which is irrelevant to idle stop control.

The starter generator 13 is coupled to a second battery 25 and cranks the engine 10 with power supplied from the second battery 25 when the engine 10 is restarted due to idle stop control. The starter generator 13 includes a pulley 13a which is fixed to a rotational shaft thereof. The pulley 13a is linked to a crank pulley 10a, which is fixed to a crankshaft of the engine 10 via a belt 19. The starter generator 13 may be formed integrally with a rectifier circuit and a voltage regulator and may also serve as a generator that generates electricity using power of the engine 10. The starter generator 13 generates electricity when it is driven to rotate by the engine 10 via the belt 19, supplies a voltage adjusted by the voltage regulator to various electrical loads, and charges the second battery 25.

The first battery 27 and the second battery 25 are coupled via a relay 17. While the relay 17 is uncoupled at normal times, it is coupled when one of the batteries is out of order or malfunctions, and thus power can be supplied from the other.

The compressor 15 has an electromagnetic clutch 21. A pulley of the electromagnetic clutch 21 is linked to the crank pulley 10a via the belt 19. The belt may be different from a belt 19 linking the starter generator 13 and the engine 10. The compressor 15 is driven to rotate by the engine 10 when the electromagnetic clutch 21 is engaged therewith.

Next, the electronic control system that controls the drive system of the vehicle will be described. The electronic control system of the vehicle includes multiple electronic control units (ECUs) coupled to a communication bus 50 such as a controller area network (CAN). Each of the ECUs has, for instance, a microcomputer, a microprocessor unit, or the like. In addition, some or all of the ECUs may have updatable software such as firmware, or may be a program module that is executed according to commands from a central processing unit (CPU) or the like.

In addition, each ECU has a storage device, which is not illustrated, that stores programs executed by the microcomputer or the like, and information such as parameters to be used in various arithmetic operations, detection data, and results of arithmetic operations. The storage device may be a storage element, for instance, a random access memory (RAM), a read only memory (ROM), or the like, or a storage device such as a hard disk drive (HDD), a CD-ROM, or a storage device.

The ECUs include an engine ECU 51, a transmission ECU 53, and an air conditioner ECU 55. The engine ECU 51 controls the engine 10. The transmission ECU 53 controls the automatic transmission 20. The air conditioner ECU 55 controls air-conditioning inside the vehicle through the compressor 15, a blower, or the like. Each of the ECUs receives signals from various kinds of sensors and various kinds of control information transmitted via the communication bus 50. Each of the ECUs drives various actuators of the drive system based on the input of the signals and information.

A crank angle sensor 31 and a water temperature sensor 33 are coupled to the engine ECU 51. The crank angle sensor 31 detects a rotation angle of the crankshaft of the engine 10. The water temperature sensor 33 detects a temperature of cooling water of the engine 10. The engine ECU 51 controls a fuel injection timing and a fuel injection time based on signals of the sensors and controls an electronic throttle controller, which is not illustrated, to control an intake amount and output of the engine 10.

A shift position sensor 61, an accelerator sensor 63, a brake switch 65, and a vehicle speed sensor 67 are coupled to the transmission ECU 53. The shift position sensor 61 detects a shift position of a shift changer 60. The accelerator sensor 63 detects a depression amount of the accelerator pedal. The brake switch 65 outputs an ON signal when the brake pedal is depressed. The vehicle speed sensor 67 detects a vehicle speed. The transmission ECU 53 controls hydraulic pressure of oil to be supplied to the automatic transmission 20 based on the signals or control information from other ECUs and thereby controls the automatic transmission 20 according to transmission characteristics set in advance.

An air conditioner switch 71, a refrigerant pressure switch 73, and a temperature sensor 75 are coupled to the air conditioner ECU 55. The air conditioner switch 71 is operated by a passenger to activate the compressor 15. The refrigerant pressure switch 73 outputs an ON signal when pressure of the refrigerant compressed by the compressor 15 reaches a specific value or higher. The temperature sensor 75 includes one or more temperature sensors measuring temperatures inside or outside the vehicle. The air conditioner ECU 55 activates the compressor 15 via the electromagnetic clutch 21 based on signals of the sensors or control information from other ECUs and thereby controls air conditioning inside the vehicle.

<2. Vehicle Control Device>

Figure 2:
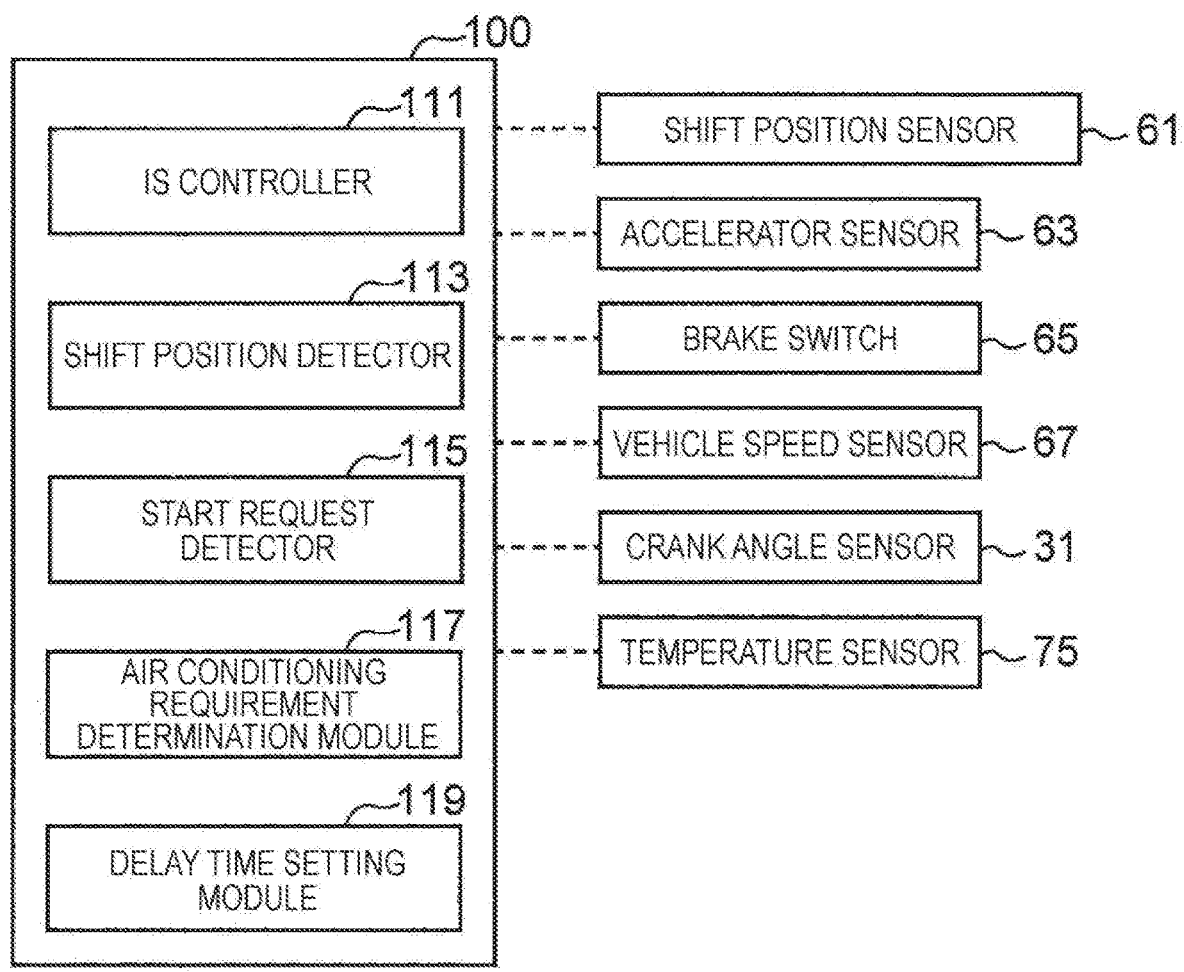
FIG. 2 is a block diagram illustrating an example of a configuration of the vehicle control device according to the embodiment.

Next, the vehicle control device according to the embodiment will be described in detail. FIG. 2 is a block diagram illustrating a functional configuration of the part related to idle stop control of the electronic control system of the vehicle.

The vehicle control device 100 includes an idle stop controller (IS controller) 111, a start request detector 115, a shift position detector 113, and a delay time setting module 119. Each of these parts is a functional part realized when one or more ECUs among the ECUs included in the electronic control system of the vehicle execute computer programs.

(Idle Stop Controller)

The idle stop controller 111 automatically stops the engine 10 when an automatic stop condition set in advance is satisfied. In addition, the idle stop controller 111 restarts the engine 10 when a restart condition set in advance is satisfied during an automatic stop of the engine 10. In one embodiment, for instance, the engine ECU 51 may serve as the idle stop controller 111.

Automatic stop conditions include that at least the engine 10 is in an operation state, that a vehicle speed is equal to or lower than a threshold value close to zero, and that a predetermined delay time has elapsed from the previous restart of the engine 10. Whether the engine 10 is in an operation state can be determined based on, for instance, a signal of the crank angle sensor 31. Whether the vehicle speed is equal to or lower than the threshold value can be determined based on a signal of the vehicle speed sensor 67. Whether a predetermined delay time has elapsed from the previous restart of the engine 10 can be determined by comparing the timer value after the restart time of the engine 10 with the delay time. The delay time is set by the delay time setting module 119.

In addition, the automatic stop conditions include that any of conditions that the brake pedal is being depressed, that the shift position of the shift changer 60 is in a non-travel range (the P or N range), and that the accelerator pedal is not being depressed is satisfied as a condition indicating that the driver is regarded as having no intention to drive in the operation state of the engine 10. The shift position can be determined based on a signal of the shift position sensor 61. The depression of the brake pedal can be determined based on a signal of the brake switch 65. The depression of the accelerator pedal can be determined based on a signal of the accelerator sensor 63.

Furthermore, automatic stop conditions include a condition that the air conditioner does not need to operate when the engine 10 is restarted due to an air conditioning requirement, which will be described below. For instance, a condition that the temperature inside the vehicle reaches a set temperature of the air conditioner can be the automatic stop condition. In the embodiment, an air conditioning requirement determination module 117 detects the satisfaction of the automatic stop condition based on the air conditioning requirement.

When the automatic stop condition is satisfied, the idle stop controller 111 stops drive of a fuel injection valve, which is not illustrated, to stop fuel injection to the engine 10. The stop of fuel injection continues until the restart condition is satisfied, and the engine 10 maintains the stop state.

The restart condition includes that at least the engine 10 is in an automatic stop state and at the same time the following driver requirement or air conditioning requirement is satisfied. The driver requirement is a condition that the driver is regarded as having made a request for starting the engine 10. For instance, the driver request may be any of satisfied conditions that the shift position of the shift changer 60 is in a travel range (the D or R range) and the depressed brake pedal has been released, or the shift position is in the travel range (the P or N range) and the accelerator pedal has been depressed. In the embodiment, the start request detector 115 detects the satisfaction of the driver request.

The air conditioning requirement is a condition that the air conditioner needs to operate. For instance, the air conditioning requirement may be a temperature inside the vehicle having increased by a predetermined threshold value or higher than a set temperature of the air conditioner. The threshold value may be fixed or variable according to the set temperature of the air conditioner or the outside temperature. In the embodiment, the air conditioning requirement determination module 117 detects the satisfaction of the air conditioning requirement.

When the restart condition is satisfied, the idle stop controller 111 resumes drive of the fuel injection value, which is not illustrated, to inject fuel to the engine 10.

(Shift Position Detector)

The shift position detector 113 detects a shift position of the shift changer 60 based on an input signal from the shift position sensor 61. In one embodiment, for instance, the transmission ECU 53 may serve as the shift position detector 113.

(Start Request Detector)

The start request detector 115 detects a driver operation indicating a request for a start of the engine 10 by the driver. In one embodiment, for instance, the engine ECU 51 may serve as the start request detector 115. The driver operation indicating a request for a start of the engine 10 may be, for instance, release of the brake pedal (switching from an ON state to an OFF state of the brake switch 65) while the shift position of the shift changer 60 is in the travel range (the D or R range), or depression of the accelerator pedal (an increase in the depression amount of the accelerator pedal from zero) while the shift position is in the non-travel range (the P or R range).

(Air Conditioning Requirement Determination Module)

The air conditioning requirement determination module 117 detects satisfaction of the above-described air conditioning requirement based on, for instance, signals from the various temperature sensors 75. In one embodiment, for instance, the air conditioner ECU 55 may serve as the air conditioning requirement determination module 117.

(Delay Time Setting Module)

The delay time setting module 119 sets a delay time from when the engine 10 is restarted until when an automatic stop of the engine 10 is permitted based on a driver operation detected by the start request detector 115 and a shift position detected by the shift position detector 113. In one embodiment, for instance, the engine ECU 51 may serve as the delay time setting module 119.

In the embodiment, the delay time setting module 119 sets the delay time to zero when the previous restart of the engine 10 was due to an intention of the driver. Specifically, the delay time setting module 119 sets the delay time to zero when the restart of the engine 10 was due to a request from the driver. That is, when the driver restarted the engine 10 on his or her own intention, the engine 10 is set to automatically stop promptly when the state shifts to a state in which the driver is regarded as not having an intention to drive. For instance, when the driver repeatedly depresses and releases the accelerator pedal during driving of the vehicle, a prompt restart of the engine 10 takes place, and thus the driver does not have a sense of discomfort.

On the other hand, when the previous restart of the engine 10 was not due to the intention of the driver, that is, it was due to the air conditioning requirement, the delay time setting module 119 sets the delay time to have a predetermined length. At this time, the delay time setting module 119 varies the delay time depending on whether the shift position is in the D range or the non-travel range (the P or N range). The delay time setting module 119 may set the delay time when the shift position is in the non-travel range to be longer than the delay time when the shift position is in the D range.

When the shift position is in the D range, the driver may be regarded as being ready to start driving the vehicle while he or she is not performing an operation of releasing the brake pedal or depressing the accelerator pedal. It may be a case in which, for instance, the engine 10 is likely to be restarted due to the air conditioning requirement while the vehicle is caught in a traffic jam or waiting for a traffic light. In such a case, the delay time setting module 119 sets a first delay time that is short enough not to give the sense of annoyance to the driver. The first delay time may be set to, for instance, 30 seconds.

In addition, when the shift position is in the non-travel range, the driver is not likely to perform an operation of releasing the brake pedal or depressing the accelerator pedal, and further can be regarded as not having an intention to drive the vehicle. For instance, the engine 10 may be restarted due to the air conditioning requirement while the vehicle is stopped in a parking lot or the like. In this case, if automatic stops and restarts of the engine 10 are repeated even though the driver has no intention to drive the vehicle, the driver is more likely to feel the sense of annoyance, and thus the delay time setting module 119 sets a second delay time that is long enough not to give the sense of annoyance to the driver. The second delay time may be set to, for instance, 90 seconds.

FIG. 3 illustrates examples of delay times set by the delay time setting module 119. If the shift position has not been changed from the D range after the previous restart of the engine 10 and the reason for the restart of the engine 10 is a driver operation, the delay time setting module 119 permits an automatic stop of the engine 10 while setting the delay time to zero. In this case, because the driver is conscious of having performed an operation of releasing the brake pedal or depressing the accelerator pedal, he or she hardly feels annoyance even when the engine 10 automatically stops in a short time.

If the shift position has not been changed from the D range after the previous restart of the engine 10 and the reason for a restart of the engine 10 is not a driver operation, the delay time setting module 119 permits an automatic stop of the engine 10 while setting the delay time to a first delay time that is shorter than a second delay time. In this case, since the driver is ready to drive the vehicle although he or she has not performed an operation of releasing the brake pedal or depressing the accelerator pedal, the engine 10 is set to be continuously driven for a predetermined period of time even after the automatic stop condition is satisfied so as not to cause the driver to feel the sense of annoyance.

If the shift position has not been changed from the R range after the previous restart of the engine 10, the delay time setting module 119 does not permit an automatic stop of the engine 10. In this case, the automatic stop of the engine 10 based on idle stop control is set not to be performed in order to prevent a sense of jumping to backward driving at the time of a restart of the engine 10 after an automatic stop.

If the shift position has not been changed from the non-travel range (the P or N range) after the previous restart of the engine 10 and the reason for a restart of the engine 10 is a driver operation, the delay time setting module 119 permits an automatic stop of the engine 10 while setting the delay time to zero. In this case, since the driver is conscious of having performed an operation of releasing the brake pedal or depressing the accelerator pedal, he or she does not feel the sense of annoyance even when the engine 10 automatically stops in a short time.

If the shift position has not been changed from the non-travel range since the previous restart of the engine 10 and the reason for a restart of the engine 10 is not a driver operation, the delay time setting module 119 permits an automatic stop of the engine 10 while setting the delay time to the longer second delay time. In this case, since the driver neither has performed an operation of releasing the brake pedal or depressing the accelerator pedal nor has an intention to drive the vehicle, the engine 10 is set to be continuously driven for a long period of time even after the automatic stop condition is satisfied so as not to cause the driver to feel the sense of annoyance.

If the previous restart of the engine 1 was performed in the travel range (the D or R range) and then the shift position is shifted to the non-travel range and the reason for the restart of the engine 10 is a driver operation, the delay time setting module 119 permits an automatic stop of the engine 10 while setting the delay time to zero. In this case, since the driver is conscious of having performed an operation of releasing the brake pedal or depressing the accelerator pedal, he or she does not feel the sense of annoyance even when the engine 10 automatically stops in a short time.

If the shift position is switched to the non-travel range after the previous restart of the engine 10 was performed in the travel range and the reason for the restart of the engine 10 is not a driver operation, the delay time setting module 119 permits an automatic stop of the engine 10 while setting the delay time to the longer second delay time. In this case, since the driver neither has performed an operation of releasing the brake pedal or depressing the accelerator pedal nor has an intention to drive the vehicle, the engine 10 is set to be continuously driven for a long period of time even after the automatic stop condition is satisfied so as not to cause the driver to feel the sense of annoyance.

If the shift position is switched to the D range after the previous restart of the engine 10 was performed in the non-travel range and the reason for the restart of the engine 10 is a driver operation, the delay time setting module 119 permits an automatic stop of the engine 10 while setting the delay time to zero. In this case, since the driver is conscious of having performed an operation of releasing the brake pedal or depressing the accelerator pedal, he or she hardly feels the sense of annoyance even when the engine 10 automatically stops in a short time.

If the shift position is switched to the D range after the previous restart of the engine 10 was performed in the non-travel range and the reason for the restart of the engine 10 is not a driver operation, the delay time setting module 119 permits an automatic stop of the engine 10 while setting the delay time to the first time that is shorter than the second delay time. In this case, since the driver is ready to drive the vehicle even though he or she performed neither the operation of releasing the brake pedal nor the operation of depressing the accelerator pedal, the engine 10 is set to be continuously driven for a predetermined period of time even after the automatic stop condition is satisfied so as not to cause the driver to feel the sense of annoyance.

If the shift position is switched to the R range after the previous restart of the engine 10 was performed in the non-travel range, the delay time setting module 119 does not permit an automatic stop of the engine 10. In this case, the automatic stop of the engine 10 based on idle stop control is set not to be performed in order to prevent a sense of jumping to backward driving at the time of a restart of the engine 10 after the automatic stop.

By setting the delay times as exemplified in FIG. 3, it is possible to both reduce a sense of annoyance of the driver and secure a stop time of the engine 10 based on idle stop control. Further, the first delay time and the second delay time can be set to any appropriate values taking the sense of annoyance that affects the driver and the fuel consumption reduction effect resulting from idle stop control into account.

<3. Operation of Vehicle Control Device>

Operations of the vehicle control device 100 according to the embodiment will be described below with reference to the flowcharts illustrated in FIG. 4 and FIG. 5. Further, the description will start from the state of the engine 10 in an automatic stop below.

Figure 4:
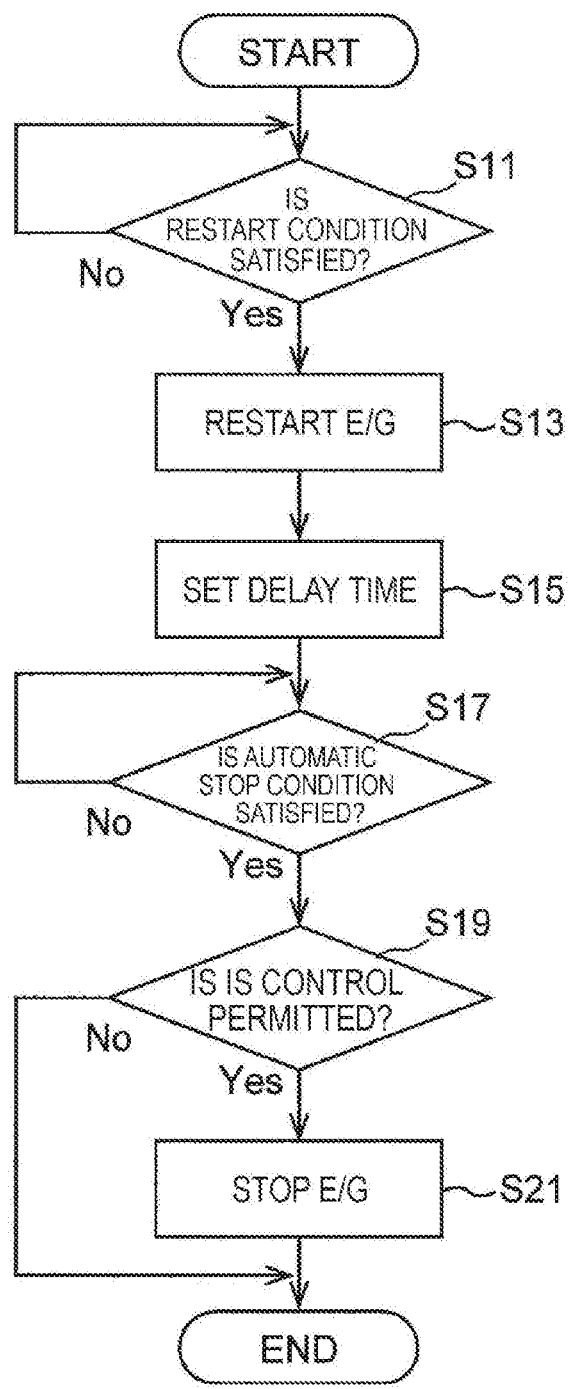
FIG. 4 is a flowchart illustrating an example of an operation of the vehicle control device according to the embodiment.

FIG. 4 is a flowchart illustrating the main routine of an operation of the vehicle control device 100. First, the idle stop controller 111 determines whether the restart condition of the engine 10 is satisfied based on various sensor signals (Step S11). If the restart condition is not satisfied (No in S11), the idle stop controller 111 repeats the determination of Step S11.

If the restart condition is satisfied (Yes in S11), the idle stop controller 111 causes the engine 10 to restart (Step S13). In this case, the engine ECU 51 controls the starter generator 13 such that the engine 10 is cranked and fuel injection to the engine 10 is started, and thereby the engine 10 is started. Next, the delay time setting module 119 sets the delay time when the automatic stop condition of the engine 10 is satisfied (Step S15).

Figure 5:
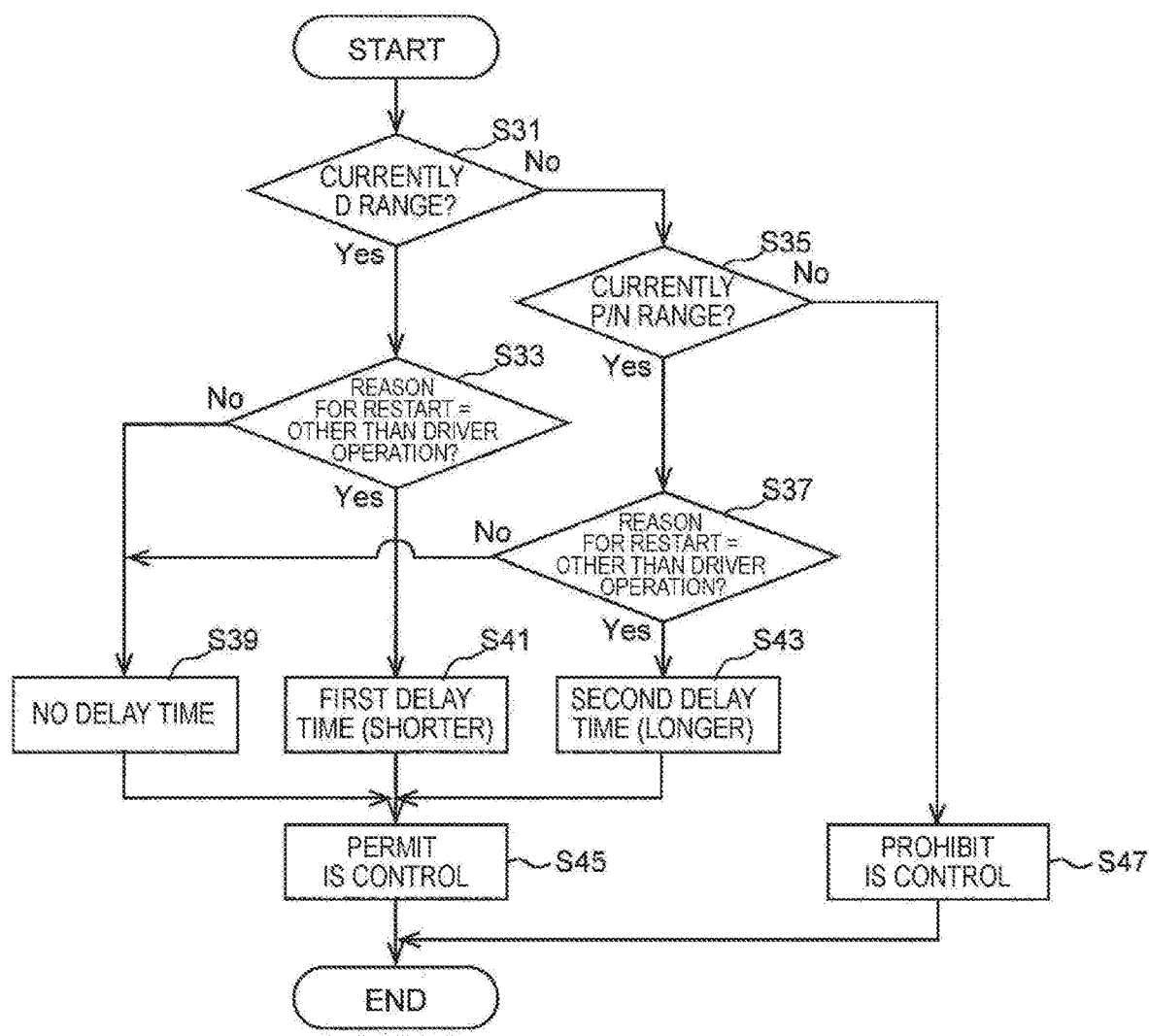
FIG. 5 is a flowchart illustrating a delay time setting process by the vehicle control device according to the embodiment.

FIG. 5 is a flowchart illustrating a sub-routine to set the delay time. First, the delay time setting module 119 determines whether the current shift position is in the D range based on the signal of the shift position sensor 61 (Step S31). If the shift position is in the D range (Yes in S31), the delay time setting module 119 determines whether the reason for the previous restart of the engine 10 is other than a driver operation (driver requirement) (Step S33).

If the reason for the previous restart of the engine 10 is a driver operation (No in S33), the delay time setting module 119 sets the delay time to zero (Step S39), permits an automatic stop of the engine 10 based on idle stop control (Step S45), and ends the routine. In addition, if the reason for the previous restart of the engine 10 is other than a driver operation, that is, the air conditioning requirement (Yes in S33), the delay time setting module 119 sets the delay time to the first delay time that is shorter than the second delay time (Step S41), permits an automatic stop of the engine 10 based on idle stop control (Step S45), and ends the routine.

On the other hand, if the shift position is not in the D range in the above-described Step S31 (No in S31), the delay time setting module 119 determines whether the shift position is in the non-travel range (the P or N range) (Step S35). If the shift position is in the non-travel range (Yes in S35), the delay time setting module 119 determines whether the reason for the previous restart of the engine 10 is other than a driver operation (the driver requirement) (Step S37).

If the reason for the previous restart of the engine 10 is a driver operation (No in S37), the delay time setting module 119 sets the delay time to zero (Step S39), permits the automatic stop of the engine 10 based on idle stop control (Step S45), and ends the routine. In addition, if the reason for the previous restart of the engine 10 is other than a driver operation, that is, the air conditioning requirement (Yes in S37), the delay time setting module 119 sets the delay time to the longer second delay time (Step S43), permits an automatic stop of the engine 10 based on idle stop control (Step S45), and ends the routine.

On the other hand, if the shift position is not in the non-travel range in the above-described Step S35, that is, if the shift position is the R range (No in S35), the delay time setting module 119 prohibits an automatic stop of the engine 10 based on idle stop control (Step S47), and ends the routine.

Returning to FIG. 4, the idle stop controller 111 determines whether the automatic stop condition of the engine 10 is satisfied based on signals of various sensors (Step S17) after the delay time is set in Step S15. The automatic stop condition also includes a condition that the delay time set in Step S15 is satisfied from the previous restart of the engine 10. If the automatic stop condition is not satisfied (No in S17), the idle stop controller 111 repeats the determination of Step S17.

On the other hand, if the automatic stop condition is satisfied (Yes in S17), the idle stop controller 111 determines whether the automatic stop of the engine 10 based on idle stop control has been permitted (Step S19). If the automatic stop of the engine 10 has not been permitted (No in S19), the idle stop controller 111 ends the routine without change. On the other hand, if the automatic stop of the engine 10 has been permitted (Yes in S19), the idle stop controller 111 causes the engine 10 to automatically stop (Step S21), and ends the routine.

The vehicle control device 100 according to the embodiment executes the above-described process illustrated in FIG. 4 and FIG. 5 each time when the engine 10 automatically stops due to idle stop control. Accordingly, it is possible to reduce a sense of annoyance of the driver and secure a stop time of the engine 10 based on idle stop control.

<4. Action of Vehicle Control Device>

Figure 6:
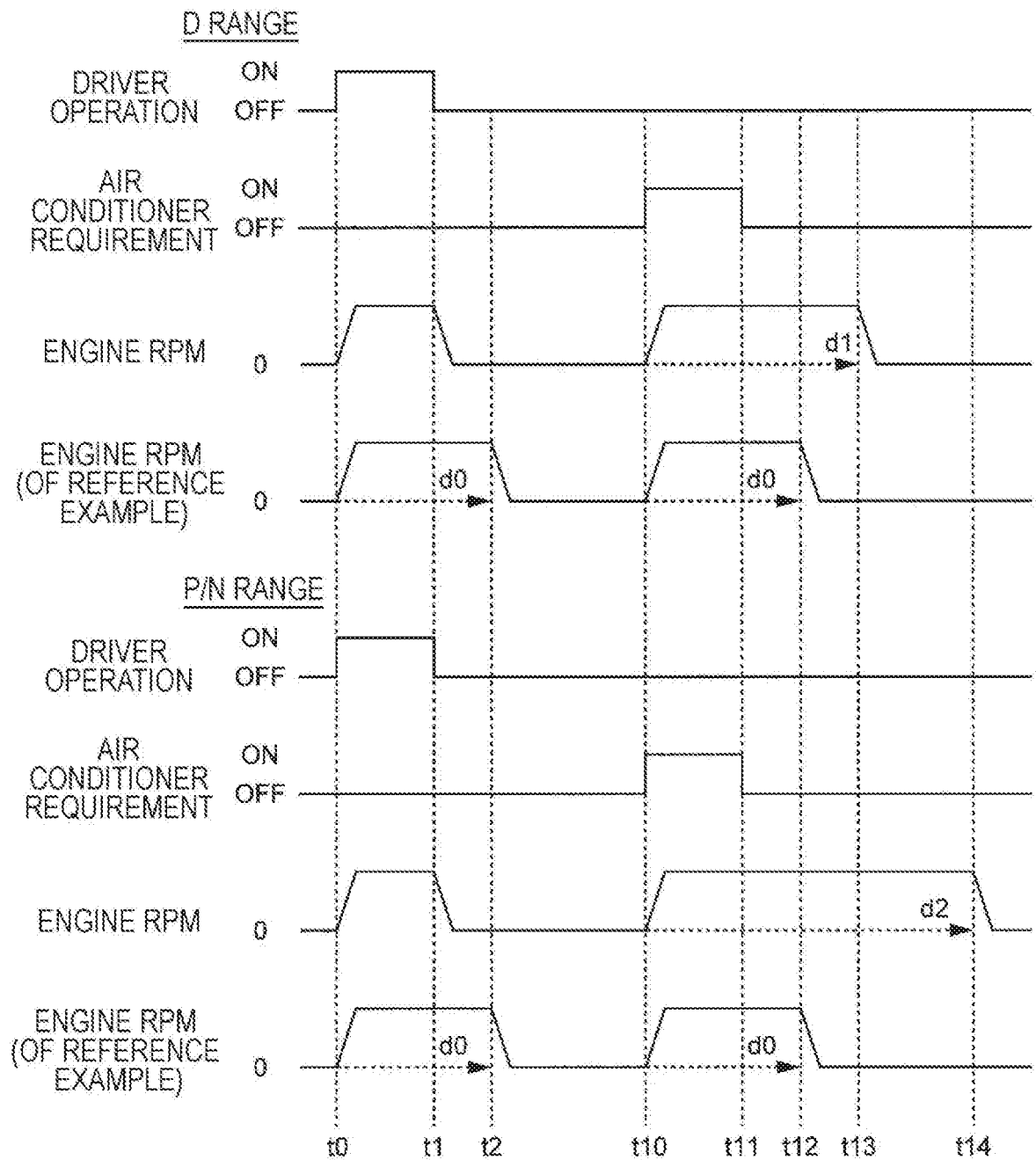
FIG. 6 is a graph illustrating effects of the vehicle control device according to the embodiment.

An action of the vehicle control device 100 according to the embodiment will be described below with reference to the timechart of FIG. 6. FIG. 6 illustrates automatic stop times of the engine 10 when the engine 10 is restarted due to a driver operation (the driver requirement) and the engine 10 is restarted due to the air conditioning requirement in each of cases where the shift position of the shift changer 60 is in the D range and in the non-travel range (the P or N range).

Further, in a reference example illustrated in FIG. 6, the delay time from when the engine 10 is restarted until when an automatic stop is permitted is set to a certain time d0 regardless of the driver requirement or the air conditioning requirement.

In the vehicle control device 100 according to the present example, the delay time is set to zero when the engine 10 restarted due to a driver operation even if the shift position is in either the D range or the non-travel range. That is, the engine 10 automatically stops promptly at a time t1 at which the predetermined automatic stop condition is satisfied after a time t0 at which the engine 10 restarted. On the other hand, in the reference example, even if the automatic stop condition is satisfied at the time t1, the engine 10 continuously operates until a time t2 that arrives after the delay time d0 elapses.

Therefore, when the engine 10 is restarted due to a driver operation in the embodiment of the vehicle control device 100 according to the present example, the engine 10 automatically stops promptly and the time in which the engine 10 stops becomes longer than in the reference example. In this case, since the driver restarts the engine 10 through his or her own operation, he or she hardly feels the sense of annoyance even when the engine 10 automatically stops.

In addition, when the engine 10 is restarted due to the air conditioning requirement while the shift position is in the D range in the vehicle control device 100 according to the present example, the delay time is set to a first delay time d1 that is shorter than a second delay time. The first delay time d1 is set to be longer than the delay time d0 of the reference example. For this reason, in the example of the vehicle control device 100 according to the embodiment, even if the automatic stop condition of the engine 10 is satisfied at a time t11 after a time t10 at which the engine 10 restarted due to the air conditioning requirement while the shift position is in the D range, the engine 10 continuously operates until a time t13 that arrives after the first delay time d1 elapses. Since the delay time d1 of the example of the embodiment is longer than the delay time d0 of the reference example, the sense of annoyance of the driver is reduced.

In addition, when the engine 10 is restarted due to the air conditioning requirement while the shift position is in the non-travel range in the vehicle control device 100 according to the present example, the delay time is set to the second delay time d2 that is longer than the first delay time d1. For this reason, in the example of the vehicle control device 100 according to the embodiment, the engine 10 continuously operates until a time t14 that arrives after the longer second delay time d2 elapses after the time t10 at which the engine 10 restarted due to the air conditioning requirement while the shift position is in the non-travel range. Therefore, the frequency of the restarts and automatic stops of the engine 10 is low when the vehicle stops in the non-travel range, and thus the sense of annoyance of the driver is reduced.

As described above, in the vehicle control device 100 according to the present example, it is possible to reduce a sense of annoyance of the driver and secure an automatic stop time of the engine 10 based on idle stop control.

Although the preferred examples of the disclosure have been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure.

For instance, although the example in which the air conditioner is assumed to be a cooling system has been described in the above-described embodiment, the air conditioning device may be a heater. If the heater supplies warm air to the inside of the vehicle by circulating cooling water of the engine using the cooling water pump that uses power of the engine and exchanging heat with the heater core, the cooling water pump stops when the engine automatically stops. In this case, the heater can be activated by restarting the engine without a driver operation. Even when the disclosure is applied to a vehicle equipped with the heater, it is possible to reduce a sense of annoyance of the driver and secure an automatic stop time of the engine 10 based on idle stop control.

In addition, although the automatic stop and restart of the engine 10 that are not due to a driver operation are due to the air conditioning requirement in the above-described example, the disclosure is not limited thereto. The disclosure can also be applied to a vehicle that is set to operate other accessories while the engine is automatically stopped, for instance, an on-board generator, and the like.

According to disclosure, it is possible to both reduce a sense of annoyance that can be given to passengers resulting from repeated restarting and automatic stopping of an engine and reduce a fuel consumption amount resulting from a secured stop time of the engine.

The invention claimed is:

1. A vehicle control device for a vehicle comprising:
a memory;
a processor coupled with the memory and configured to:
execute idle stop control to stop an engine of the vehicle when a stop condition is satisfied,
restart the engine when a restart condition is satisfied during the stop of the engine, and
detect a driver operation indicating a request for starting the engine by a driver; and
a shift position detector configured to detect a shift position of a shift changer,
wherein the processor is configured to inhibit the idle stop control for a delay time from when the engine is restarted under the idle stop control, and
wherein the processor is configured to change the delay time on a basis of the shift position and reason for restart of the engine.

2. The vehicle control device according to claim 1, wherein the delay time setting module varies a length of the delay time according to the shift position when a restart of the engine is not due to the driver operation.

3. The vehicle control device according to claim 2, wherein the delay time setting module sets the delay time to be shorter when the shift position is in a travel range than when the shift position is in a non-travel range.

4. The vehicle control device according to claim 2, wherein that the restart of the engine is not due to the driver operation means that a restart is due to an operation condition of an on-board air conditioner.

5. The vehicle control device according to claim 3, wherein that the restart of the engine is not due to the driver operation means that a restart is due to an operation condition of an on-board air conditioner.

6. The vehicle control device according to claim 1, wherein the delay time setting module sets the delay time to zero when a restart of the engine is due to the driver operation.

7. The vehicle control device according to claim 2, wherein the delay time setting module sets the delay time to zero when a restart of the engine is due to the driver operation.

8. The vehicle control device according to claim 3, wherein the delay time setting module sets the delay time to zero when a restart of the engine is due to the driver operation.

9. The vehicle control device according to claim 4, wherein the delay time setting module sets the delay time to zero when a restart of the engine is due to the driver operation.

10. The vehicle control device according to claim 5, wherein the delay time setting module sets the delay time to zero when a restart of the engine is due to the driver operation.

11. The vehicle control device according to claim 1, wherein the driver operation comprises at least an operation of depressing an accelerator pedal or an operation of releasing a depressed brake pedal.

12. The vehicle control device according to claim 2, wherein the driver operation comprises at least an operation of depressing an accelerator pedal or an operation of releasing a depressed brake pedal.

13. The vehicle control device according to claim 3, wherein the driver operation comprises at least an operation of depressing an accelerator pedal or an operation of releasing a depressed brake pedal.

14. The vehicle control device according to claim 4, wherein the driver operation comprises at least an operation of depressing an accelerator pedal or an operation of releasing a depressed brake pedal.

15. The vehicle control device according to claim 5, wherein the driver operation comprises at least an operation of depressing an accelerator pedal or an operation of releasing a depressed brake pedal.

16. A vehicle control device for a vehicle comprising:
a shift position sensor to detect a shift position, and circuitry configured to execute idle stop control to stop an engine of the vehicle when a stop condition is satisfied and to restart the engine when a restart condition is satisfied during the stop of the engine, the circuitry configured to:
detect a driver operation indicating a request for starting the engine by a driver,
of a shift changer,
inhibit the idle stop control for a delay time from when the engine is restarted under the idle stop control, and
change the delay time on a basis of the shift position and reason for restart of the engine.

* * * * *